United States Patent
Kovach et al.

(10) Patent No.: US 9,521,798 B2
(45) Date of Patent: Dec. 20, 2016

(54) CRUMBLER BASKET DOWN PRESSURE ADJUSTMENT SYSTEM

(71) Applicant: CNH Industrial America LLC, New Holland, PA (US)

(72) Inventors: Michael G. Kovach, Morton, IL (US); Sven N. Setterdahl, Maquon, IL (US); Dean A. Knobloch, Tucson, AZ (US); Timothy R. Blunier, Danvers, IL (US)

(73) Assignee: CNH Industrial America LLC, New Holland, PA (US)

( * ) Notice: Subject to any disclaimer, the term of this patent is extended or adjusted under 35 U.S.C. 154(b) by 0 days.

(21) Appl. No.: 14/339,902

(22) Filed: Jul. 24, 2014

(65) Prior Publication Data

US 2015/0053433 A1 Feb. 26, 2015

Related U.S. Application Data

(60) Provisional application No. 61/868,225, filed on Aug. 21, 2013.

(51) Int. Cl.
*A01B 63/32* (2006.01)
*A01B 49/02* (2006.01)
*A01B 29/04* (2006.01)

(52) U.S. Cl.
CPC ............. *A01B 63/32* (2013.01); *A01B 49/027* (2013.01); *A01B 29/048* (2013.01)

(58) Field of Classification Search
CPC .................... A01B 29/00–29/06; A01B 63/32; A01B 63/28; A01B 33/087; A01B 49/027
See application file for complete search history.

(56) References Cited

U.S. PATENT DOCUMENTS

| | | | |
|---|---|---|---|
| 4,489,789 A | 12/1984 | Pearce | |
| 4,884,919 A | 12/1989 | Moore | |
| 5,234,060 A | 8/1993 | Carter | |
| 5,833,011 A | 11/1998 | Boerlein | |
| 6,068,061 A | 5/2000 | Smith et al. | |
| 6,554,078 B1 * | 4/2003 | McDonald | A01B 49/027 172/146 |
| 6,681,868 B2 | 1/2004 | Kovach et al. | |
| 6,761,120 B2 | 7/2004 | Kovach et al. | |
| 6,763,896 B1 | 7/2004 | Hurtis | |
| 6,843,047 B2 | 1/2005 | Hurtis | |
| 6,871,709 B2 | 3/2005 | Knobloch et al. | |
| 6,896,068 B2 * | 5/2005 | Dietrich, Sr. | A01B 49/027 172/142 |

(Continued)

*Primary Examiner* — Matthew D Troutman
(74) *Attorney, Agent, or Firm* — Rebecca L. Henkel

(57) ABSTRACT

An agricultural tillage implement includes a main frame including a hitch extending in a travel direction, at least one secondary frame, a plurality of rolling basket assemblies and a pressure control system. The secondary frame is coupled with the frame. The plurality of rolling basket assemblies include first and second rolling basket assemblies. Both first and second rolling basket assemblies are coupled to the at least one secondary frame. The first rolling basket assembly has an effective length, and the second rolling basket assembly has a different effective length. The pressure control system is configured to supply different selected pressures to the first and second rolling basket assembly to substantially equalize a down pressure per unit of effective length of the rolling basket assemblies.

19 Claims, 7 Drawing Sheets

(56) References Cited

U.S. PATENT DOCUMENTS

| | | | |
|---|---|---|---|
| 6,926,093 B1 * | 8/2005 | Fink | A01B 63/26 172/261 |
| 7,065,945 B2 | 6/2006 | Hurtis | |
| 7,766,093 B2 | 8/2010 | Becker et al. | |
| 8,020,629 B1 * | 9/2011 | McFarlane | A01B 21/08 172/145 |
| D667,847 S * | 9/2012 | Kovach | D15/11 |
| 2003/0196823 A1 * | 10/2003 | McDonald | A01B 49/027 172/146 |
| 2004/0016554 A1 * | 1/2004 | McDonald | A01B 49/027 172/146 |
| 2006/0021769 A1 * | 2/2006 | Ankenman | A01B 49/02 172/156 |
| 2008/0066935 A1 * | 3/2008 | Becker | A01B 63/32 172/13 |
| 2011/0284252 A1 | 11/2011 | Friggstad et al. | |
| 2012/0227991 A1 | 9/2012 | Hake et al. | |
| 2014/0054051 A1 * | 2/2014 | Landoll | A01B 63/008 172/170 |
| 2014/0209335 A1 * | 7/2014 | Casper | A01B 5/04 172/260.5 |
| 2014/0251646 A1 * | 9/2014 | Gray | A01B 61/044 172/1 |

* cited by examiner

CRUMBLER BASKET DOWN PRESSURE ADJUSTMENT SYSTEM

CROSS REFERENCE TO RELATED APPLICATIONS

This is a non-provisional application based upon U.S. provisional patent application Ser. No. 61/868,225, entitled "CRUMBLER BASKET DOWN PRESSURE ADJUSTMENT SYSTEM", filed Aug. 21, 2013 which is incorporated herein by reference.

BACKGROUND OF THE INVENTION

1. Field of the Invention

The present invention relates to agricultural implements, and, more particularly, to agricultural tillage implements.

2. Description of the Related Art

Farmers utilize a wide variety of tillage implements to prepare soil for planting. Some such implements include two or more sections coupled together to perform multiple functions as they are pulled through fields by a tractor. For example, a field cultivator is capable of simultaneously tilling soil and leveling the tilled soil in preparation for planting. A field cultivator has a frame that carries a number of cultivator shanks with shovels at their lower ends for tilling the soil. The field cultivator converts compacted soil into a level seedbed with a consistent depth for providing excellent conditions for planting of a crop. Grass or residual crop material disposed on top of the soil is also worked into the seedbed so that it does not interfere with a seeding implement subsequently passing through the seedbed.

A field cultivator as described above may also include an optional rear auxiliary implement for finishing the seedbed for seeding. For example, a rear auxiliary implement may include a spike tooth harrow, spring tooth harrow, rolling (aka. crumbler) basket, etc., or any combination thereof. The crumbler basket has a reel with a plurality of blades for breaking clods into smaller sizes and chopping up the debris still remaining on the top of the soil.

The crumbler basket arrangement can be used to roll behind the rows of tines of a harrow, to flatten the ridges left by the tines and move the residual crop material into the soil to enhance contact with the soil. The crumbler basket is used to provide a firm, level field with coarse soil on top that resists crusting, with the finer soil particles at planting depth for optimum seed-to-soil contact.

The control of the positioning of the crumbler baskets include fixed position settings carried out with pins, bolts or mechanical crank adjustments, which requires the operator to manually adjust the framework coupled to the crumbler baskets to adjust the downward pressure on the crumbler baskets to thereby control the depth of the blades.

What is needed in the art is an easy to use mechanism for the positioning of rolling baskets of an agricultural tillage implement.

SUMMARY OF THE INVENTION

The present invention provides a tillage implement with rolling basket assemblies, which are configured to provide an equalized down pressure per linear foot of rolling basket.

The invention in one form is directed to an agricultural tillage implement that includes a frame including a hitch extending in a travel direction, at least one secondary frame, a plurality of rolling basket assemblies and a pressure control system. The secondary frame is coupled with the frame. The plurality of rolling basket assemblies include first and second rolling basket assemblies. Both first and second rolling basket assemblies are coupled to the secondary frame. The first rolling basket assembly has an effective length, and the second rolling basket assembly has a different effective length. The pressure control system is configured to supply different selected pressures to the first and second rolling basket assembly to substantially equalize a down pressure per unit of effective length of the rolling basket assemblies.

The invention in another form is directed to a rolling basket implement attached to an agricultural tillage implement having a frame and at least one secondary frame, the rolling basket implement including a plurality of rolling basket assemblies having first and second rolling basket assemblies. Both first and second rolling basket assemblies are coupled to the secondary frame. The first rolling basket assembly has an effective length, and the second rolling basket assembly has a different effective length. The pressure control system is configured to supply different selected pressures to the first and second rolling basket assembly to substantially equalize a down pressure per unit of effective length of the rolling basket assemblies.

The invention in yet another form is directed to a method of controlling down pressure of rolling basket assemblies coupled to an agricultural implement, the method includes the steps of determining a first effective length, determining a second effective length and equalizing a down pressure. The determining a first effective length step determines a first effective length of a set of rolling baskets associated with a first rolling basket assembly. The determining a second effective length step determines a second effective length of a set of rolling baskets associated with a second rolling basket assembly, said first effective length being different than said second effective length. The equalizing a down pressure step equalizes the down pressure of the set of rolling baskets associated with the first rolling basket assembly with the set of rolling baskets associated with the second rolling basket assembly per unit of length.

An advantage of the present invention is that the cultivator can employ rolling baskets with different lengths and the down pressure is equalized.

Another advantage is that the down pressure of the rolling baskets is equalized when there are different numbers of actuators providing down pressure.

BRIEF DESCRIPTION OF THE DRAWINGS

The above-mentioned and other features and advantages of this invention, and the manner of attaining them, will become more apparent and the invention will be better understood by reference to the following description of embodiments of the invention taken in conjunction with the accompanying drawings, wherein.

Corresponding reference characters indicate corresponding parts throughout the several views. The exemplifications set out herein illustrate some embodiments of the invention and such exemplifications are not to be construed as limiting the scope of the invention in any manner.

DETAILED DESCRIPTION OF THE INVENTION

Figure 1:
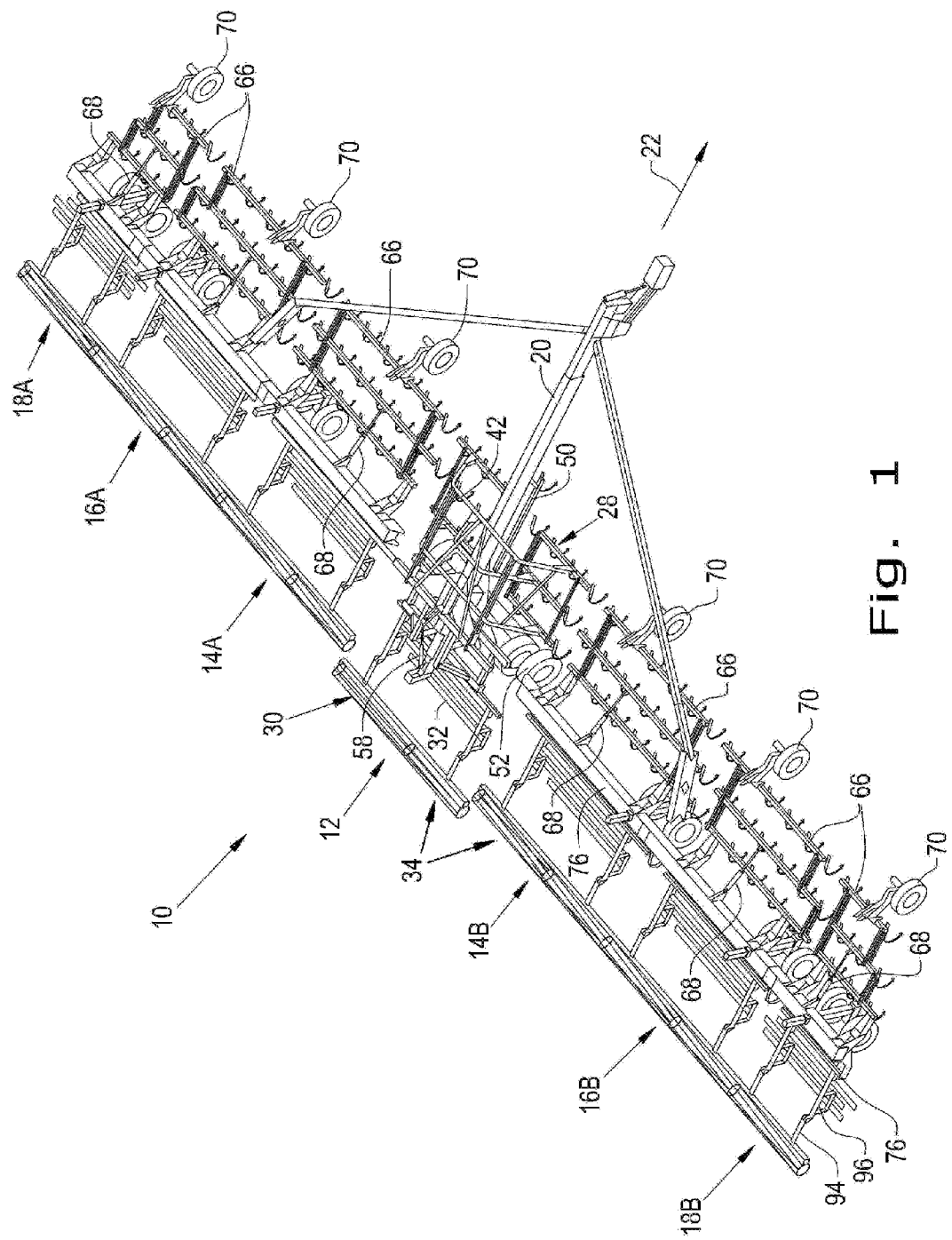
FIG. 1 is a top perspective view of an embodiment of an agricultural tillage implement, in the form of a field cultivator using rolling baskets of the present invention.
Figure 2:
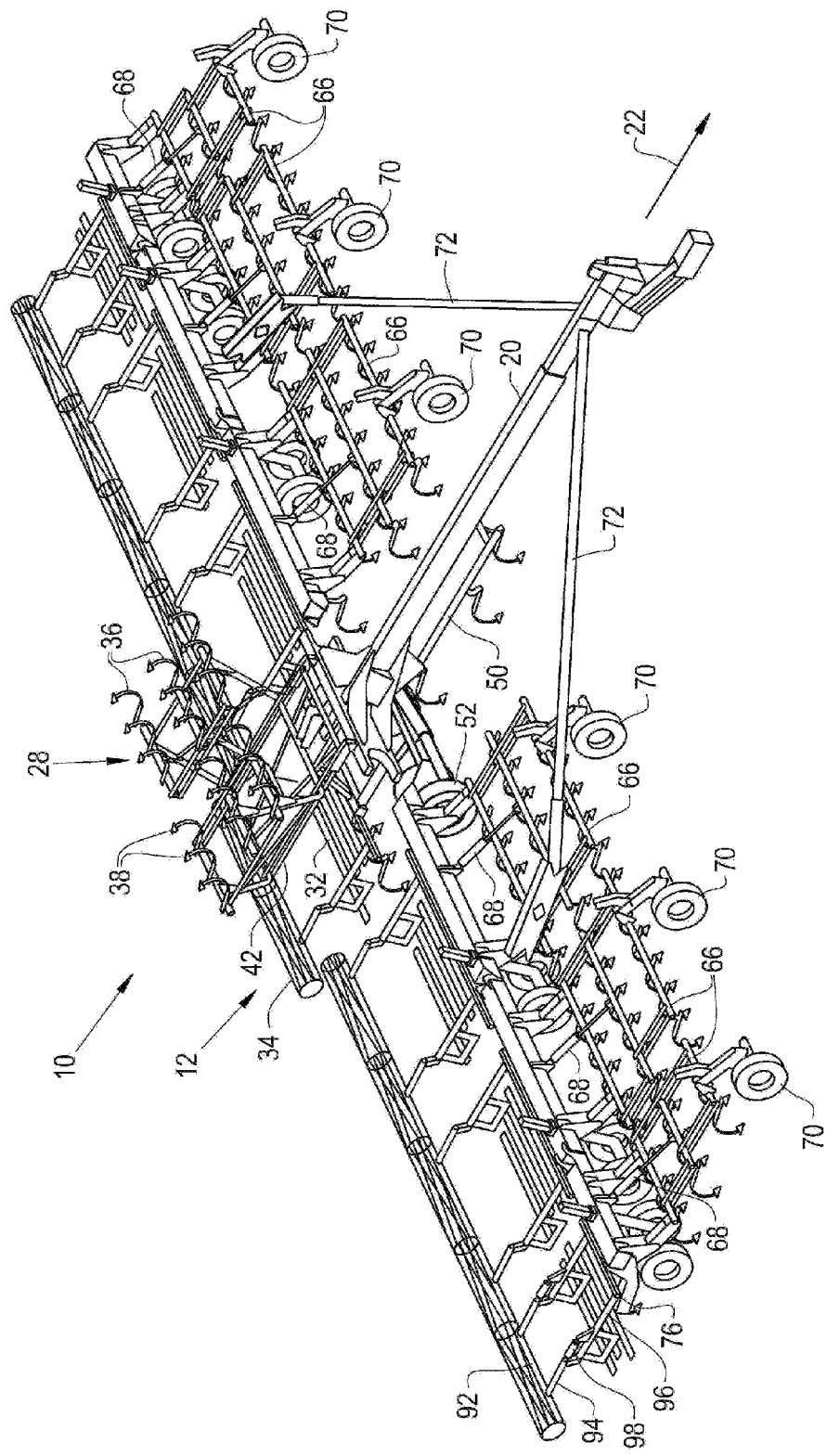
FIG. 2 is the same top perspective view shown in FIG. 1, with the center shank frame folded to a transport position.
Figure 3:
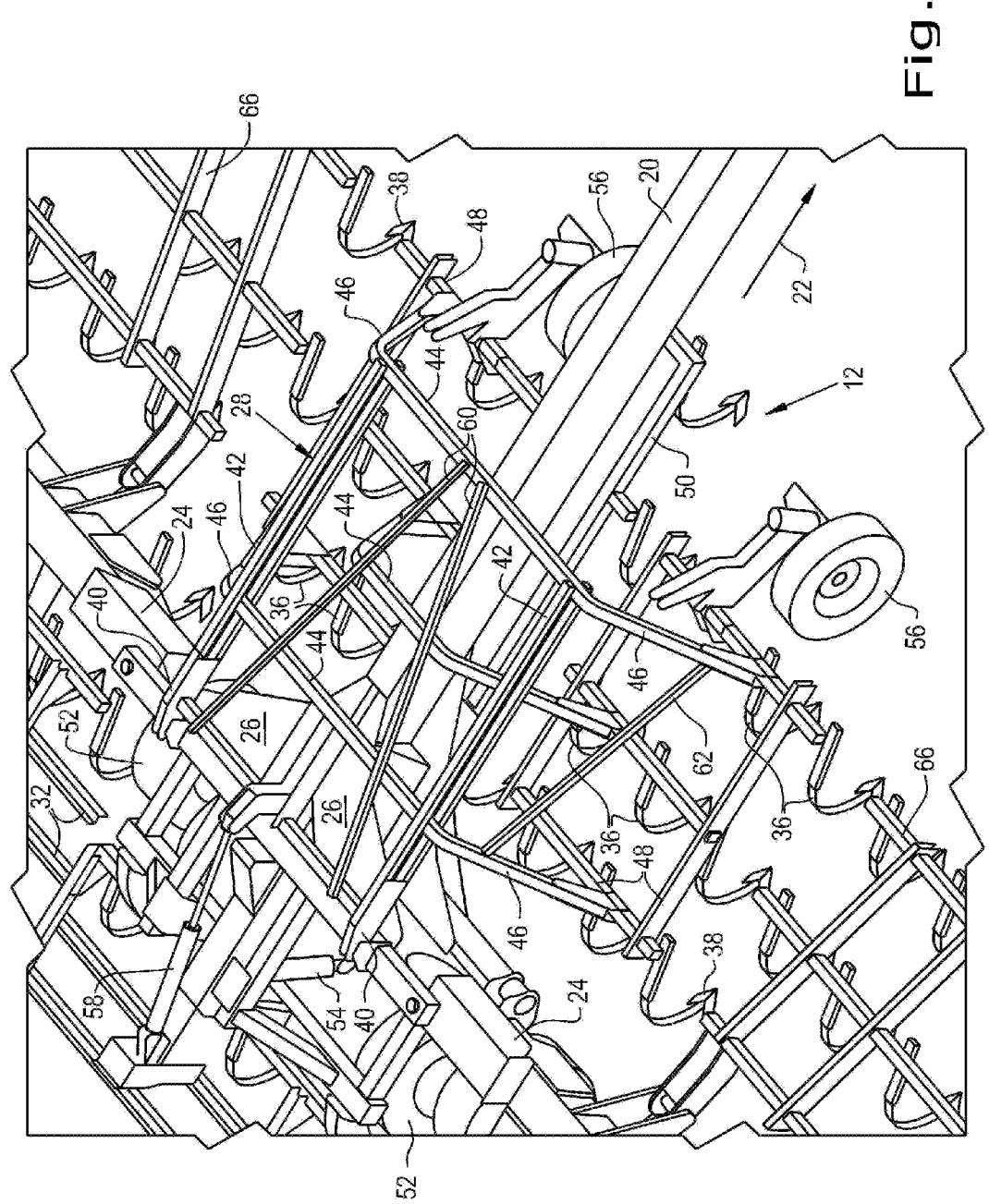
FIG. 3 is a top perspective view of the center frame section with the center shank frame in the operating position.

Referring now to the drawings, and more particularly to FIGS. 1-3, there is shown an embodiment of a tillage implement using rolling baskets of the present invention. In the illustrated embodiment, the tillage implement is in the form of a field cultivator 10 for tilling and finishing soil prior to seeding.

Field cultivator 10 as illustrated in FIG. 1 is configured as a multi-section field cultivator, and includes a main frame section 12 and a plurality of wing sections 14, 16 and 18. The left wings sections are designated 14A, 16A and 18A, and the right wing sections are designated 14B, 16B and 18B. Wing sections 14A and 14B are each inner wing sections, wing sections 16A and 16B are each middle wing sections, and wing sections 18A and 18B are each outer wing sections.

Main frame section 12 is the center section that is directly towed by a traction unit, such as an agricultural tractor (not shown). Main frame section 12 includes a pull hitch tube 20 extending in a travel direction 22, and a tool bar 24 which is coupled with and extends transverse to pull hitch tube 20. Reinforcing gusset plates 26 may be used to strengthen the connection between pull hitch tube 20 and tool bar 24. Main frame section 12 generally functions to carry a shank frame 28 for tilling the soil, and a rear auxiliary implement 30 for finishing the soil. Rear auxiliary implement 30 includes a spring tooth drag 32 and a rolling (aka, crumbler) basket assemblies 34 which coact with each other to finish the soil.

Shank frame 28 generally functions to carry cultivator shanks 36 with shovels 38 at their lower ends for tilling the soil. Shank frame 28 is pivotally coupled with tool bar 24, preferably at the top of tool bar 24, such as with couplings 40. Shank frame 28 is positioned in front of the tool bar 24 when in an operating position (FIGS. 1 and 3), and is foldable up and over the tool bar 24 to a position rearward of tool bar 24 when in a transport position (FIG. 2). Shank frame 28 includes a pair of longitudinal frame members 42 which are pivotally coupled with tool bar 24 at one end thereof using couplings 40. A plurality of cross frame members 44 are coupled with the longitudinal frame members 42. Each of the cross frame members 44 have a pair of opposite outboard ends 46 which extend horizontally past longitudinal frame members 42, then in a downwardly angled direction, whereby the outboard ends 46 are positioned on opposite lateral sides of the pull hitch tube 20 when in an operating position. The outboard ends 46 of cross frame members 44 are coupled with a pair of respective shank sub-frames 48. Shank sub-frames 48 are spaced apart from each other in a direction transverse to pull hitch tube 20 and are positioned on respective opposite lateral sides of pull hitch tube 20 when in an operating position.

A center shank sub-frame 50 is attached to and positioned below pull hitch tube 20. Since shank sub-frames 48 are spaced apart on either side of pull hitch tube 20, center shank sub-frame 50 functions to till the soil in the intermediate open space between the two shank sub-frames 48. Center shank sub-frame 50 includes a number of cultivator shanks and corresponding shovels; three in the illustrated embodiment. Center shank sub-frame 50 is raised up and down with the raising and lowering of rear lift wheels 52 using hydraulic cylinder 54.

Shank frame 28 also includes one or more gauge wheel assemblies 56 which function to set a tillage depth of shank sub-frames 48. In the illustrated embodiment, shank frame 28 includes two gauge wheel assemblies 56 which are respectively coupled with a front of a respective shank sub-frame 48. A hydraulic cylinder 58 is used to fold shank frame 28 from the operating position to the transport position, and vice versa. Hydraulic cylinder 58 may be placed in a "float mode" such that gauge wheel assemblies 56 are operable to float up and down as they traverse across a field and thereby set the operating depth at the front edge of shank frame 28.

Shank frame 28 may also include additional support frame members 60 and 62 which provide structural rigidity. Support frame members 60 extend diagonally across the top of shank frame 28, and support frame members 62 extend diagonally between the outboard ends 46 of cross frame members 44.

A hydraulic cylinder 54 is provided to lift the frame using rear lift wheels 52 to configure cultivator 10 for transport. Hydraulic cylinder 58 is provided to fold shank frame 28 up and over tool bar 24 to an inverted position rearward of tool bar 24. Shank sections 66 of the wing sections 14, 16 and 18 are configured to be folded upwards to a position at or near vertical using hydraulic cylinders 68. Diagonally angled boom arms 72 extend between a forward end of pull hitch tube 20 and a respective tool bar 24 associated with the pair of middle wing sections 16A and 16B. Gauge wheel assemblies 56 at the front of center shank frame 28 and gauge wheel assemblies 70 at the front of wing sections 14, 16 and 18 are all configured as caster wheels so that they can pivot to a travel direction when field cultivator 10 is moved in travel direction 22 when in the folded or transport state.

Now, additionally referring to FIGS. 4-7, there is shown another embodiment of a tillage implement 110 of the present invention. In this illustrated embodiment, the tillage implement is for tilling and finishing soil prior to seeding. The references to tillage implement 110 and how the rolling basket assemblies 34 and control system 102 relate thereto, are equally applicable to tillage implement 10.

Figure 4:
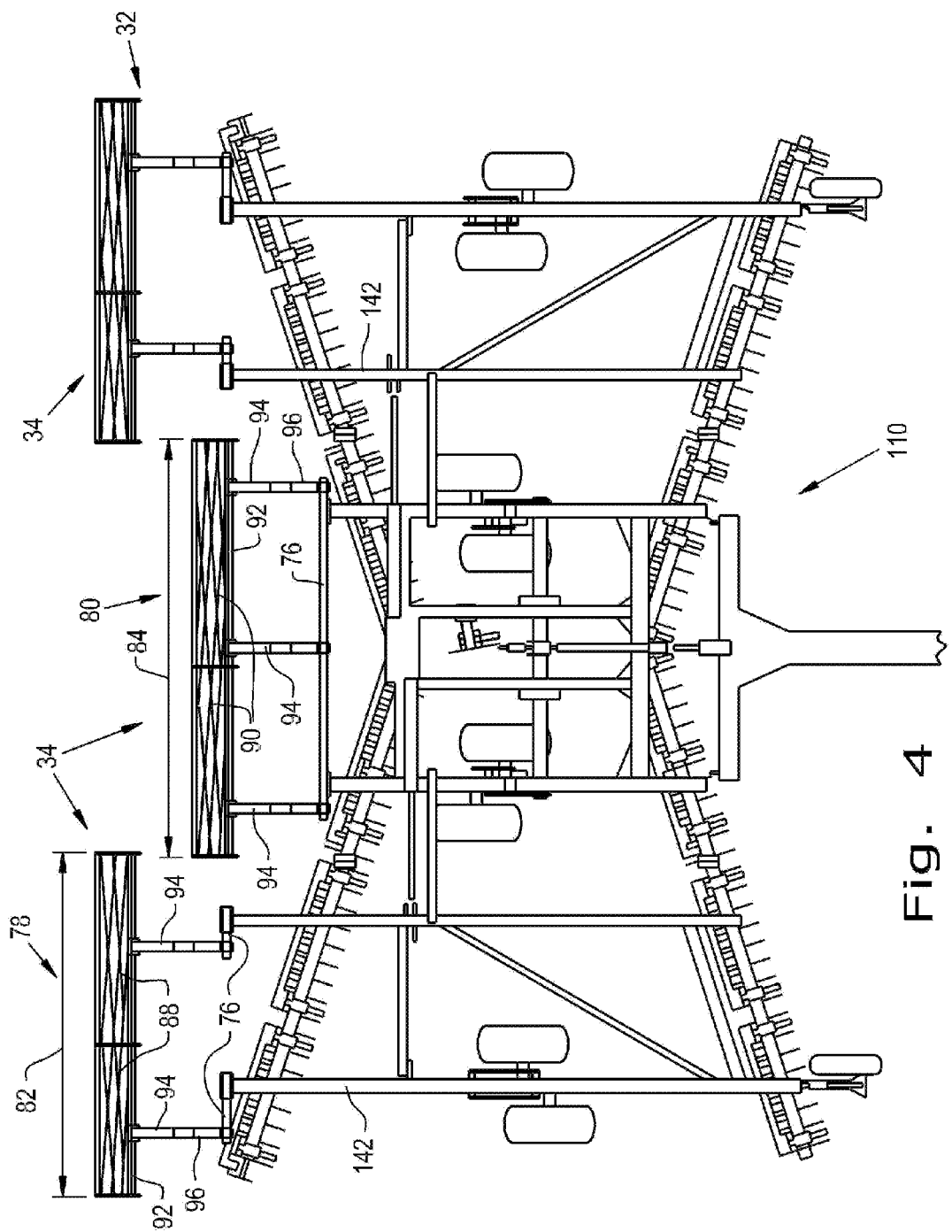
FIG. 4 is a top view of another embodiment of a tillage implement using rolling basket assemblies of the present invention.
Figure 5:
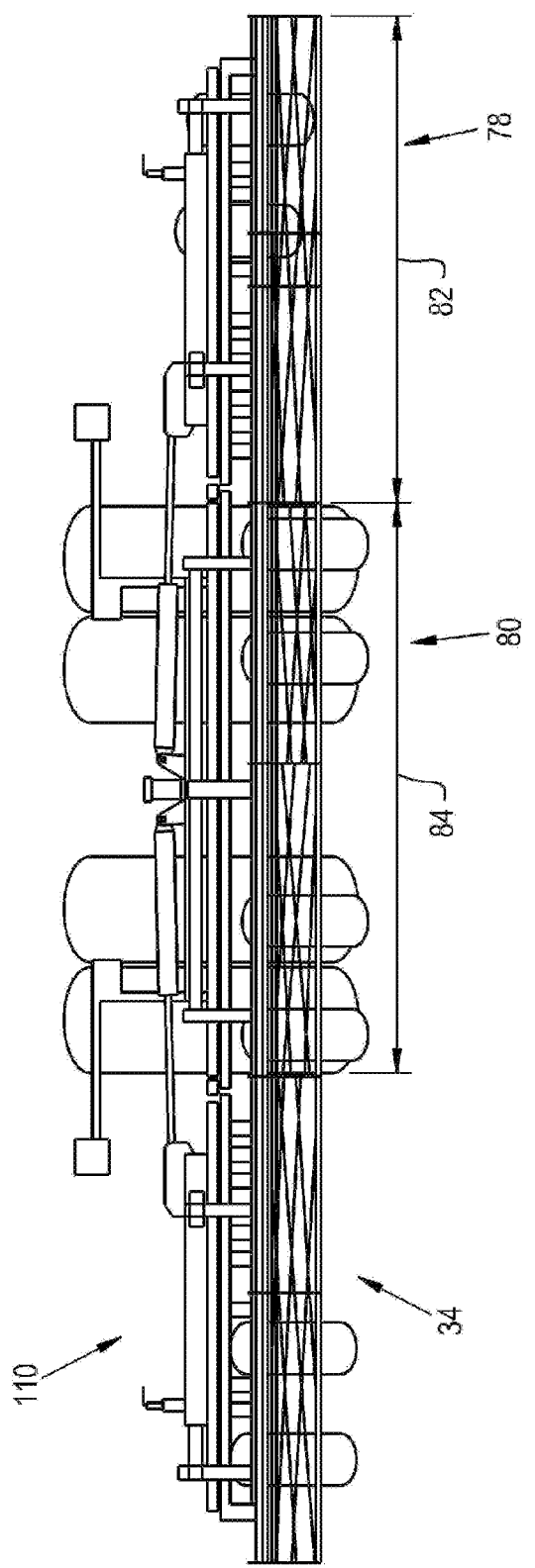
FIG. 5 is a rear view of the tillage implement shown in FIG. 4.

Tillage implement 110 as illustrated in FIGS. 4 and 5 is configured as a multi-section field implement, which may be a gang disc, and includes a main frame section and a plurality of wing sections. Tillage implement 110 includes rear auxiliary implements 32 for finishing the soil. Rear auxiliary implement 32 may include a spring tooth drag and rolling (aka, crumbler) basket assemblies 34, which act to finish the soil.

Rolling basket assemblies 34 each have at least one secondary frame 76 coupled to longitudinal frame members. Rolling basket assemblies 34, for the purpose of discussion, include a rolling basket assembly 78 and a rolling basket assembly 80. Here rolling basket assembly 78 has an effective length 82, which is the total length of the rolling baskets, which make up rolling basket assembly 78. In a similar fashion rolling basket assembly 80 has an effective length 84. Effective length 84 is longer than effective length 82. A pressure control system 102 is used to alter the pressure applied to rolling basket assemblies 78 and 80 proportional to effective lengths 82 and 84 so that a substantially equal down pressure per linear unit of measure is established.

Rolling basket assembly 78 has a set of rolling baskets 88 and rolling basket assembly 80 has a set of rolling baskets 90, each rotationally coupled to respective sub-frames 92. Pivoting arms 94 are pivotally coupled to secondary frame 76 by way of brackets 96. Actuators 98, illustrated here in the form of hydraulic cylinders, are pivotally coupled to both brackets 96 and pivot arms 94. Pressure control system 102 includes a control 86 and control valves 100 to provide the selected pressures to actuators 98 to provide the equalized down pressure for rolling baskets 88 and 90.

Figure 6:
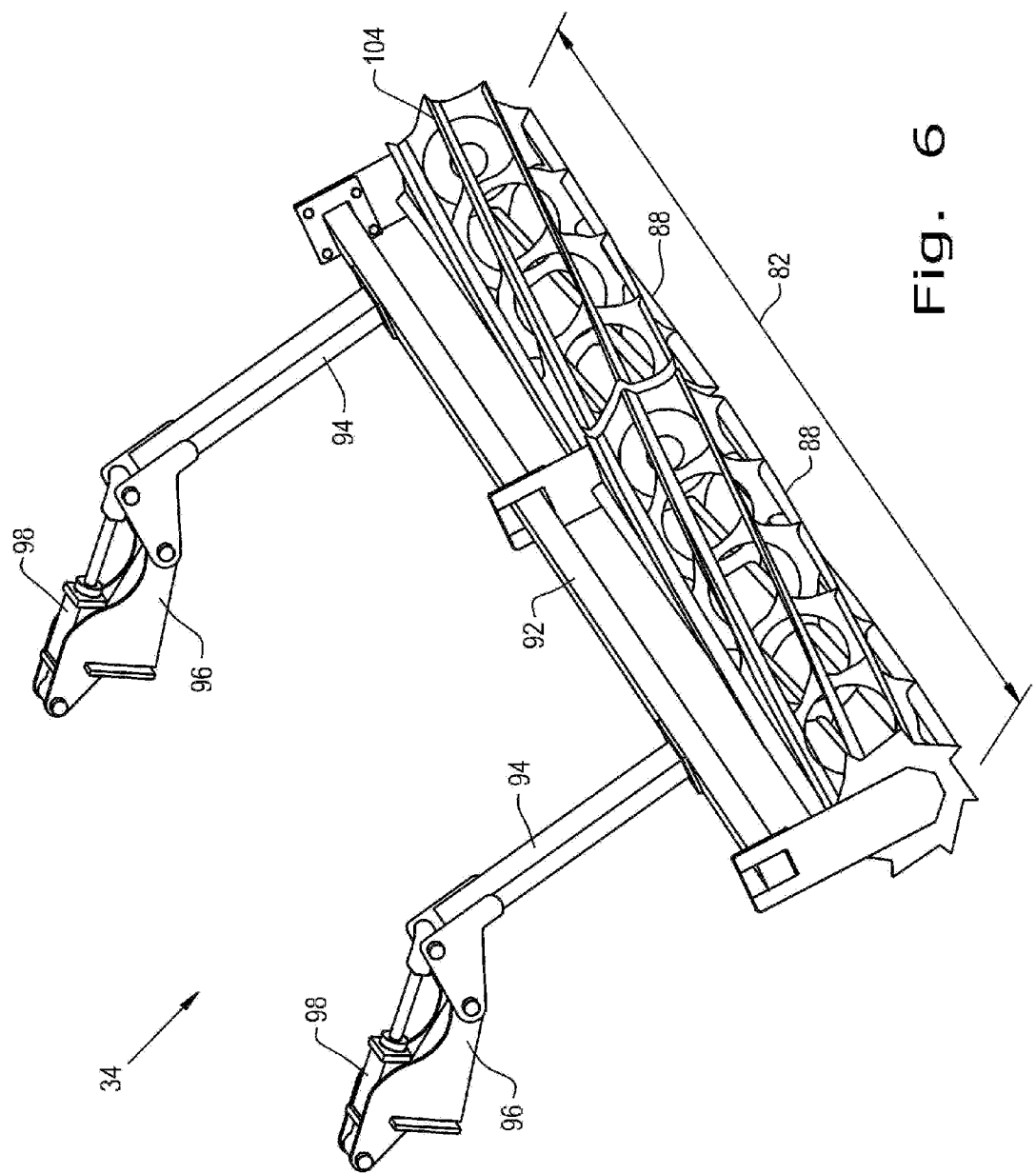
FIG. 6 is a perspective view of one of the rolling basket assemblies used with the tillage implements shown in FIGS. 1-5.
Figure 7:
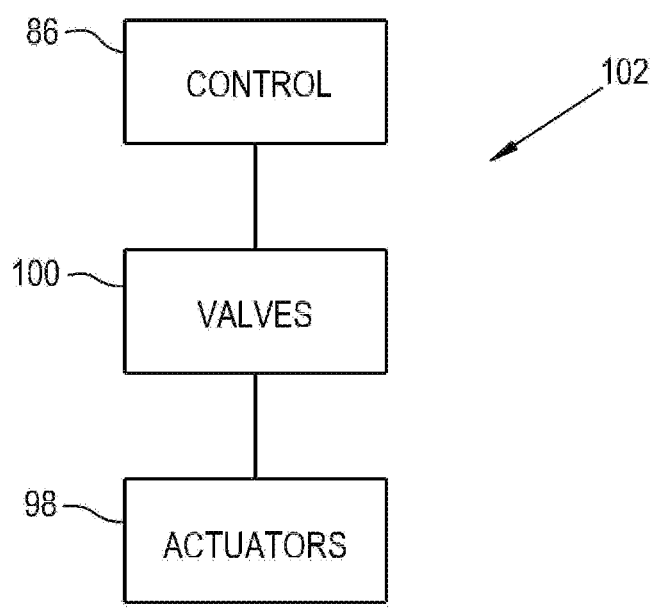
FIG. 7 is a schematical representation of a control system used by the embodiments of the present invention.

In FIG. 6 two rolling baskets 88 are shown having effective length 82, while the two baskets are shown having substantially equal length, differing lengths are shown in FIG. 4 in rolling basket assembly 80. Also, FIG. 4 shows rolling basket assembly 80 with three pivoting arms 94 which each have an associated actuator. Pressure control system 102 takes the number of actuators into account as well to accomplish the goal of providing substantially equal down pressure on rolling baskets 88 and 90 per linear unit of measure. Pressure control system 102 can be thought of as compensating for the effective actuator surface area of each rolling basket assembly 34 to which the pressurized fluid will be supplied. For example, if one section has two actuators 98 having a total of 6 square inches of surface area exposed to fluid pressurized at a first pressure, and another section has three actuators 98 with a total of 9 square inches exposed to fluid pressurized at a second pressure and the effective lengths of the rolling baskets are equal, then pressure control system 102 will provide 1.5 times as much pressure to the first section (the first pressure) than it does to the second section (the second pressure), thereby offsetting the difference in the actuator effective area disparity and maintaining an equalized down pressure per unit of effective length of the rolling baskets. As discussed herein, pressure control system 102 also varies the pressure applied to accommodate variations in the geometry of the rolling basket assemblies 34 and the relative effective lengths of the rolling baskets.

Control 86 of pressure control system 102 may be integral with valves 100 to direct the appropriate down pressure to each rolling basket assembly 34 so that the down pressure is uniform and may be 120 lbs/ft, although other pressures are also contemplated. Pressure control system 102 may be located in the towing vehicle or connected to a part of the structure of tillage implement 110. When it is time for lifting rolling basket assemblies 34 up from the ground, the proportional pressures supplied through valves 100 is removed and a reverse action by actuators 98 is performed to lift rolling basket assemblies 34 up. It is also contemplated to have a float mode where no pressurized fluid is supplied by valves 100 and there may be no fluid flow constrictions to allow rolling basket assemblies 34 to float on the ground. It is further contemplated that if tillage implement 110 has only two sets of effective lengths involved that there may be just two valves needed so that each similar effective length section will be respectively coupled to the valve that will supply the appropriately proportioned pressure.

In addition to compensating for the differing effective lengths of the rolling baskets and the number of actuators associated with each rolling basket assembly 34, it is contemplated that pressure control system 102 will also compensate for differing diameters of rolling baskets, differing number of bars 104 in the rolling baskets, differing widths of bars 104, differing shapes of bars 104, differing lengths of pivot arms 94, and differing actuator 98 characteristics to apply a substantially equalized down pressure per unit of effected area beneath the rolling baskets. The present invention while equalizing the down pressure per linear foot of rolling basket, the down pressure can vary during operation as the baskets encounter variations in the field.

Advantageously, the present invention adds actuators 98 to provide for the raising and lowering of the rolling baskets as compared to the current methods that require the use of wrenches and is time consuming. Another advantage is that the present invention is applicable to a large number of tillage equipment platforms.

While this invention has been described with respect to at least one embodiment, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. An agricultural tillage implement, comprising:
   a frame section including a pull hitch extending in a travel direction;
   at least one secondary frame coupled with said frame;
   a plurality of rolling basket assemblies including a first rolling basket assembly and a second rolling basket assembly, both said first rolling basket assembly and said second rolling basket assembly being coupled to said at least one secondary frame, said first rolling basket assembly having a first effective length, said second rolling basket assembly having a second effective length, said first effective length and said second effective length being different;
   at least one actuator associated with said first rolling basket assembly and at least one actuator associated with said second rolling basket assembly; and
   a pressure control system coupled to said plurality of rolling basket assemblies, said pressure control system being configured to:
      determine a first effective actuator surface area of the at least one actuator associated with said first rolling basket assembly and a second effective actuator surface area of the at least one actuator associated with said second rolling basket assembly; and
      adjusting a down pressure associated with said first rolling basket assembly and a down pressure associated with said second rolling basket assembly to substantially equalize the down pressure associated with said first rolling basket assembly with the down pressure associated with said second rolling basket assembly per unit of effective length of the first and second rolling basket assemblies.

2. The agricultural tillage implement of claim 1, wherein each of said rolling basket assemblies further include:
   a sub-frame;
   at least one rolling basket rotationally coupled to said sub-frame, said at least one rolling basket of said first rolling basket assembly having said first effective length, said at least one rolling basket of said second rolling basket assembly having said second effective length; and
   at least one pivoting arm pivotally coupled to said secondary frame, said at least one pivoting arm being connected to said sub-flame;

wherein the at least one actuator is coupled to said at least one pivoting arm, said actuator receiving a pressurized fluid under control of said pressure control system.

3. The agricultural tillage implement of claim 2, wherein said at least one rolling basket of said first rolling basket assembly is a plurality of rolling baskets that collectively have said first effective length, said at least one rolling basket of said second rolling basket assembly having is a plurality of rolling baskets collectively having said second effective length.

4. The agricultural tillage implement of claim 3, wherein said pressure control system further includes at least one valve to provide a first fluid pressure to said actuator of said first rolling basket assembly and a second fluid pressure to said actuator of said second rolling basket assembly proportional to said first effective length and said second effective length.

5. The agricultural tillage implement of claim 3, wherein said at least one pivoting arm of said first rolling basket assembly is a first plurality of pivoting arms and said at least one pivoting arm of said second rolling basket assembly is a second plurality of pivoting arms.

6. The agricultural tillage implement of claim 5, wherein said pressure control system is further configured to take into account said first plurality of pivoting arms and said second plurality of pivoting arms when equalizing the downward pressure of said rolling baskets of said first rolling basket assembly and said rolling baskets of said second rolling basket assembly.

7. The agricultural tillage implement of claim 6, wherein said first plurality is a different amount than said second plurality.

8. The agricultural tillage implement of claim 6, wherein said first plurality and said second plurality are the same.

9. A rolling basket implement attached to an agricultural tillage implement having a frame connected to at least one secondary frame, the rolling basket implement comprising:
a plurality of rolling basket assemblies including a first rolling basket assembly and a second rolling basket assembly, both said first rolling basket assembly and said second rolling basket assembly being coupled to said at least one secondary frame, said first rolling basket assembly having a first effective length, said second rolling basket assembly having a second effective length, said first effective length and said second effective length being different;
at least one actuator associated with said first rolling basket assembly and at least one actuator associated with said second rolling basket assembly; and
a pressure control system coupled to said plurality of rolling basket assemblies, said pressure control system being configured to:
determine a first effective actuator surface area of the at least one actuator associated with said first rolling basket assembly and a second effective actuator surface area of the at least one actuator associated with said second rolling basket assembly; and
adjust a down pressure associated with said first rolling basket assembly and a down pressure associated with said second rolling basket assembly to substantially equalize a down pressure per unit of effective length of the first and second rolling basket assemblies.

10. The rolling basket implement of claim 9, wherein each of said rolling basket assemblies further include:
a sub-frame;
at least one rolling basket rotationally coupled to said sub-frame, said at least one rolling basket of said first rolling basket assembly having said first effective length, said at least one rolling basket of said second rolling basket assembly having said second effective length; and
at least one pivoting arm pivotally coupled to said secondary frame, said at least one pivoting arm being connected to said sub-frame;
wherein the at least one actuator coupled to said at least one pivoting arm, said actuator receiving a pressurized fluid under control of said pressure control system.

11. The rolling basket implement of claim 10, wherein said at least one rolling basket of said first rolling basket assembly is a plurality of rolling baskets that collectively have said first effective length, said at least one rolling basket of said second rolling basket assembly having is a plurality of rolling baskets collectively having said second effective length.

12. The rolling basket implement of claim 11, wherein said pressure control system further includes at least one valve to provide a first fluid pressure to said actuator of said first rolling basket assembly and a second fluid pressure to said actuator of said second rolling basket assembly proportional to said first effective length and said second effective length.

13. The rolling basket implement of claim 11, wherein said at least one pivoting arm of said first rolling basket assembly is a first plurality of pivoting arms and said at least one pivoting arm of said second rolling basket assembly is a second plurality of pivoting arms.

14. The rolling basket implement of claim 13, wherein said pressure control system is further configured to take into account said first plurality of pivoting, arms and said second plurality of pivoting arms when equalizing the downward pressure of said rolling baskets of said first rolling basket assembly and said rolling baskets of said second rolling basket assembly.

15. The rolling basket implement of claim 14, wherein said first plurality is a different amount than said second plurality.

16. The rolling basket implement of claim 14, wherein said first plurality and said second plurality are the same.

17. A method of controlling down pressure of rolling basket assemblies coupled to an agricultural implement, the method comprising the steps of:
determining a first effective length of a set of rolling baskets associated with a first rolling basket assembly;
determining a second effective length of a set of rolling baskets associated with a second rolling basket assembly, said first effective length being different than said second effective length;
equalizing a down pressure of said set of rolling baskets associated with said first rolling basket assembly with said set of rolling baskets associated with said second rolling basket assembly per unit of length; and
determining a first effective actuator surface area of actuators associated with said first rolling basket assembly and a second effective actuator surface area of actuators associated with said second rolling basket assembly.

18. The method of claim 17, wherein said equalizing step includes the step of setting a proportional pressure of a fluid with at least one valve, said fluid providing the down pressure.

19. The method of claim 17, wherein said equalizing step is carried out by a control system that also takes into account said first effective actuator surface area and said second effective actuator surface area.

* * * * *